United States Patent
Leib

[11] 3,993,400
[45] Nov. 23, 1976

[54] METHOD AND APPARATUS FOR FORMING ERASABLE, REAL TIME, OPTICAL CIRCUITS

[75] Inventor: Kenneth G. Leib, Wantagh, N.Y.

[73] Assignee: Grumman Aerospace Corporation, Bethpage, N.Y.

[22] Filed: Feb. 14, 1975

[21] Appl. No.: 550,040

[52] U.S. Cl. .................... 350/96 C; 350/160 LC; 350/96 WG
[51] Int. Cl.² ........................................ G02B 5/14
[58] Field of Search ............ 350/96 BC, 96 C, 96 B, 350/96 WG, 320, 160 L, 160 LC

[56] References Cited
UNITED STATES PATENTS

| | | | |
|---|---|---|---|
| 3,503,668 | 3/1970 | Di Domenico, Jr. et al. | 350/150 |
| 3,579,316 | 5/1971 | Dyott et al. | 350/96 C |
| 3,732,429 | 5/1973 | Baunstein et al. | 350/160 C |
| 3,740,734 | 6/1973 | Maldonado | 350/160 |
| 3,795,433 | 3/1974 | Channin | 350/96 C |
| 3,918,794 | 11/1975 | Milton | 350/96 B |

*Primary Examiner*—John K. Corbin
*Assistant Examiner*—B. Wm. delos Reyes
*Attorney, Agent, or Firm*—Morgan, Finnegan, Pine, Foley & Lee

[57] ABSTRACT

A method and apparatus for forming optical circuit channels and components in a transducer for connecting optical elements coupled to the transducer including the steps of and associated apparatus for, generating a light beam, directing the light beam toward the transducer, controlling the transmission of the light beam to expose a predetermined portion of the transducer to the light beam in accordance with a predetermined pattern, optically coupling certain optical elements of the transducer in accordance with the predetermined circuit pattern formed in the transducer by the light beam, and erasing the optical pattern formed in the transducer.

41 Claims, 10 Drawing Figures

METHOD AND APPARATUS FOR FORMING ERASABLE, REAL TIME, OPTICAL CIRCUITS

The present invention relates to optical circuits, and more specifically to erasable integrated optical circuits.

Integrated optical circuits are known in the art, see U.S. Pat. No. 3,716,804 (Groschwitz). Further, various techniques are known for generating integrated optical circuits. U.S. Pat. No. 3,695,745 (Furukawa) discloses a light wave guide circuit having fixed electrode strips on an electro-optic material. A voltage applied across opposing electrodes on opposite surfaces of the electro-optic material provides a light path in the electro-optic material. See also U.S. Pat. No. 3,795,433 (Channin).

U.S. Pat. No. 3,740,734 (Maldonado) discloses a ferroelectric ceramic optical memory system with erasure means for depolarizing the memory system.

U.S. Pat. No. 3,770,339 (Ramaswamy) discloses an optical switch which utilizes an electrically induced change in the index of refraction of an electro-optic crystalline material to optically couple sections of a fiber optic light guide. See also U.S. Pat. Nos. 3,781,081 (Rokos) and 3,732,429 (Braunstein et al.) for techniques of fabrication.

It is an object of the present invention to provide real time, integrated optical circuits and components for controlling the distribution of optical signals to appropriate optical elements.

It is a further object of the present invention to provide integrated optical circuits which are variable in real time in response to changes in an optical pattern.

It is a further object of the present invention to provide erasable optical channels and components for integrated optical circuits.

It is a further object of the present invention to provide real time optical circuits and components for use with lumped circuits and components.

It is a still further object of the present invention to couple two or more fiber optic light guiding channels in a scattering mode of operation.

Other objects, aspects, and advantages of the present invention will be apparent when the detailed description is considered with the drawings.

Briefly, the present invention includes the steps of, and associated apparatus for, generating a light beam, directing the light beam toward a transducer, controlling the transmission of the light beam to expose a predetermined portion of the transducer to the light beam in accordance with a predetermined pattern, optically coupling certain optical elements connected to the transducer in accordance with the predetermined circuit pattern formed in the transducer by the light beam, and erasing the optical pattern formed in the transducer.

The present invention is illustrated in the accompanying drawings, in which.

Figure 1:
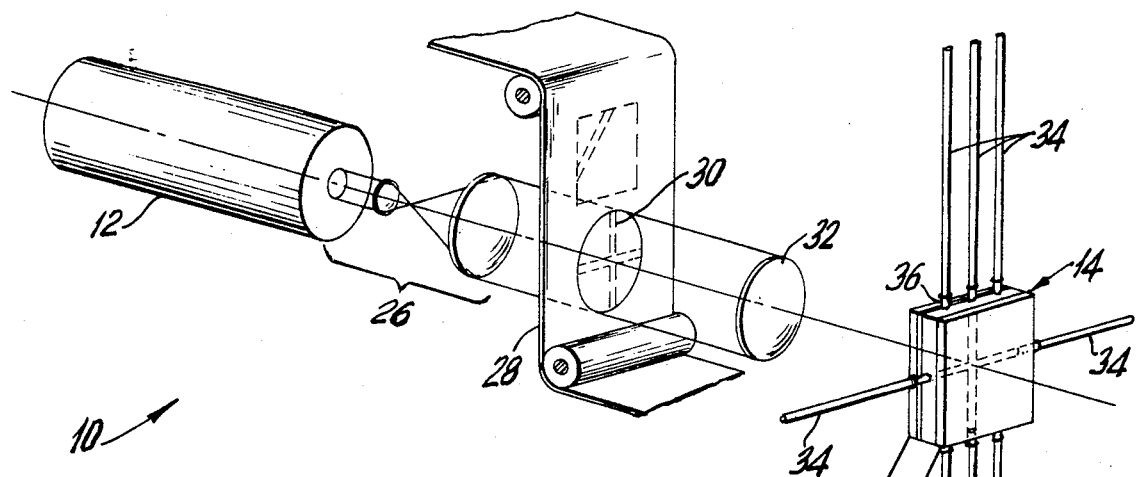
FIG. 1 is a perspective view of one embodiment of the present invention used with a liquid crystal transducer.

Referring to FIG. 1, the apparatus of the present invention is generally indicated at 10. A source of light, shown as a laser 12, e.g., an argon laser, but which may also be an appropriate LED (light emitting diode), is directed toward a real time transducer device 14. The real time transducer device 14 may be a nematic liquid crystal device or a transparent ferroelectric ceramic device.

Liquid crystals are materials which over a characteristic temperature range display both liquid and crystalline properties: There are three mesophases: smectic, nematic and cholesteric of which nematic is presently the most important for optical waveguides. When properly aligned, the nematic crystal is transparent and birefringement displaying properties of a positive or negative uniaxial crystal. The sign of the material depends upon whether the extraordinary ($N_e$) or ordinary index of refraction ($N_o$) is greater, determined by the relation, Birefringence $B=N_e-N_o$. At applied voltages in excess of those required for birefringent operation, a dynamic scattering mode of operation exists which can also be employed in the application of the present invention as described below.

One suitable nematic liquid crystal is a mixture of 4-(4'-n-hexylbenzylidene amono)-benzonitrile and 4-(4'-n-propylbenzlidene amono)-benzonitrile which has indices of refraction of approximately 4.8 and 2.5 for the directions parallel and perpendicular to the long molecule axes, respectively, see "Low Electrooptic Threshold in New Liquid Crystals", Boller, A., Sherrer, M., and Schodt, M., Proc. IEEE, Aug. 1972, p. 1002. Another example is MBBA (p-methoxybenzylidene-p-n-butylaniline) whose ordinary and extraordinary indices of refraction are 1.544 and 1.749, respectively.

Figure 2:
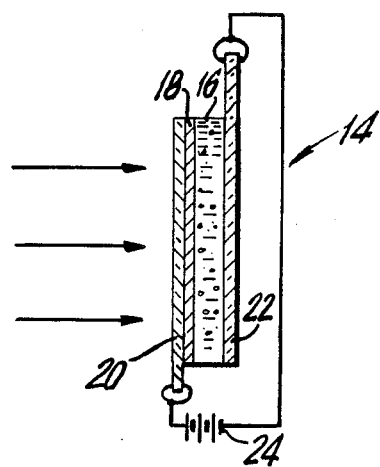
FIG. 2 is a cross-sectional view of a liquid crystal transducer for use in the present invention.

Referring specifically to FIG. 2, the transducer device 14 includes a nematic liquid crystal layer 16 which may be typically 6 or 12 microns in thickness, and a thin photoconductive layer 18 adjacent the liquid crystal layer, e.g., 1 micron in thickness and formed of cadmium sulfide. (The thickness of the liquid crystal layer is determined by the speed of response desired and/or the fiber optic sizes employed.) These two layers 16 and 18 are sandwiched between opposing faces of transparent conductive electrodes 20 and 22, which may be advantageously formed of antimony doped tin oxide, commercially known as NESA glass, or tin doped iridium oxide. A battery 24 applies a d.c. write field to the electrodes 20 and 22 to align the molecules in the liquid crystal layer 16 for optimum light transmission upon exposure of the photoconductive layer 18 to the light beam and light pattern 30. Pulsed voltage or AC may also be used to excite the liquid crystal layer 16 during the write cycle.

Illumination of the photoconductive layer 18 during the time that a voltage is applied enables a current to flow through the liquid crystal layer 16 which temporarily changes the optical characteristics (index of refraction) of the layer 16 in accordance with the light pattern presented on the photoconductive layer. The changed portions of the liquid crystal layer 16 provide light wave guides for guiding light entering parallel to the plane of the liquid crystal layer 16 through the liquid crystal layer 16 in accordance with the generated optical pattern. Since the nematic liquid crystal layer 16 can be positively or negatively birefringent, the light pattern 30 is chosen appropriately in conjunction with the liquid crystal layer 16 so that the induced change in the liquid crystal layer 16 always has an index of refraction in the guiding portion which is greater than the surrounding area. For MBBA, for example, the induced guide has an extraordinary index, $N_e = 1.749$ with the surrounding region having the ordinary index, $N_o = 1.544$, of the homeotropic alignment.

The energy density required by the liquid crystal layer 16 is given by $$Q \text{ abs.} = \frac{\alpha \rho c \nu (T_n - T_o)}{A}$$

where $\alpha$ is the absorption coefficient of the layer 16, $\rho$ the density, $C$ the specific heat, $\nu$ the volume per generated line, $A$ is the projected area of exposure, and $(T_n - T_o)$ the maximum temperature range over which operation is permitted to maintain the layer 16 in the nematic state. Typically, $(T_n - T_o) \sim 50° C$ and Q absorbed is as low as one or two microwatts per cm², showing that low powered lasers are more than adequate for writing or forming circuits in the liquid crystal layer 16. (The type of the laser is chosen to match the wavelength at which the photoconductive layer 18 is responsive.)

Referring again to FIG. 1, the laser beam emanating from the laser 12 is filtered and collimated by a filter and lens assembly 26 in a conventional manner. The filtered and collimated light beam is directed toward a mask or film 28 which carries the desired optical circuit pattern or patterns, or component to be generated in the transducer device 14.

The desired pattern 30 of the mask or film 28 may be manually or automatically brought into registration with the laser beam, and therefore with the real time transducer device as desired. Advantageously, the mask or film 28 includes a complete array of patterns for the different optical circuits or components to be generated. The film patterns may be in the form of a positive or negative, or a printed circuit mask may be employed which is formed, e.g., of copper mounted on a glass substrate. Light passes through the film positive or through those portions of the printed circuit mask where the copper has been removed. As previously described, the transmissive portions of the mask or film are chosen in conjunction with the nematic liquid crystal layer 16.

The light beam pattern resulting from the mask or film 28 is focussed by a focussing lens 32 onto the real time transducer device 14 at the proper magnification. The real time transducer device 14 includes a plurality of optical elements or fibers 34, optically coupled to the liquid crystal layer 16. Each optical element 34 may comprise a single optical fiber or a cable of fibers, and may be adapted for single mode or multi-mode propagation, as described in "Research Toward Optical-Fiber Transmission System", S. E. Miller et al., Proc. IEEE, December 1973.

Figure 3:
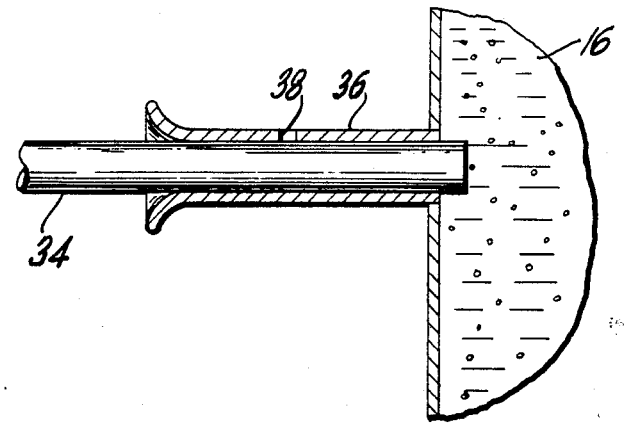
FIG. 3 is an enlarged view of an optical fiber connector.

Referring to FIG. 3, the connectors 36 for the optical fibers 34 are illustrated. The connectors 36 are advantageously tapered at one end to facilitate insertion of the fibers 34 and include holes 38 for expelling air to ensure a complete air free optical coupling between the fibers 34 and the liquid crystal layer 16. Other coupling means known in the art may be also employed to couple the fiber or fibers 34 to the real time transducer device 14. For example, see "Optical Deflection In Thin Film Nematic Liquid Crystal Waveguides", C. Hu et al., IEEE Journal Quantum Electronics, February 1974.

Some of the fibers 34 include optical signals which are transmitted from an optical source (not shown), perhaps distantly located, e.g., an injection laser. The transducer device 14 redistributes and/or conditions these optical signals for transmission to other fibers 34 in conformance with the pattern 30 of the mask or film 28 which is determined from the overall requirements of the apparatus 10.

The light striking the transducer device 14 in accordance with the pattern 30 of the film 28 results in the generation of a real time optical channel or component which couples certain of the optical fibers 34 to other optical fibers 34. Specifically, the incident light striking the cadmium sulfide photoconductor 18 causes the liquid crystal layer 16 to store the received image by undergoing a molecular re-orientation, i.e., the index of refraction of the liquid crystal layer 16 is changed at those portions of the layer 16 adjacent to the exposed photoconductive layer 18, resulting in the formation of rectangular channels or optical components.

An a.c. current source 40 provides an erasure signal for the optical pattern formed in the transducer device 14. The voltage used for the erasure signal is typically between about 10 and about 50 volts a.c., having a frequency of 1,000 to 100,000 Hz.

A curvature in the normal, fixed optical channels normally results in so-called cladding or radiation losses because the light traveling around the large radius of a bend cannot exceed the speed of light. Advantageously, radiation losses can be effectively controlled by providing variations in the index of refraction across the channel. Variations in the index of refraction of the optical channel between $N_e$ and $N_o$ of the chosen liquid crystal may be attained by controlling the intensity of the cross-section of the beam which forms the channels in the liquid crystal layer 16. This can be accomplished by employing a photographic mask 28 having a gradation in intensity, which is parabolic across the desired line width and given by the formula:

$$I = I_o [1 - \Delta (\frac{\gamma}{q})^2], 0 \leq \gamma \leq a$$

Where: I is initial beam intensity, $\Delta$ is the guide-cladding index difference, $r$ is the radius of curvature of the optical channel, and $a$ is the beam width provided that $I = $ (constant) $\times n$ in the layer 16. Such a gradation can be accomplished by the usual techniques of establishing printed microcircuits, i.e., large-drawing scale-down. At bends where the radiation loss is to be minimized or eliminated, the intensity of the photographic mask 28 is altered such that the index of refraction is proportional to the radius of curvature (r) across the optical channel, i.e., v =

$$v = \frac{c}{n_x} = \text{a constant}.$$

Alternatively, radiation losses may be controlled by controlling the intensity across the line. Diffraction from such a pattern or mask yields an intensity pattern distribution in the liquid crystal layer 16 given by $$\left(\frac{\sin x}{x}\right)^2.$$

2. This can be matched with the parabolic distribution essential for minimizing radiation losses, so that:

$$1 - \frac{x^2}{3} \approx 1 - \Delta \left(\frac{r}{a}\right)^2$$

where the first two terms of the induced diffractive distribution are equated with the desired parabolic distribution. If $X = KAP$, the diffracting aperture radius can be adjusted so that $$A^2 = 3\Delta \left(\frac{1}{KP} \frac{r}{a}\right)^2.$$

A is the aperture radius, $$K = \frac{2\pi}{\lambda}$$

and P is the beam size at the layer 16. Therefore, a parabolic variation in the index of refraction can be established according to a desired set of (r) and (a) values to induce a line in the layer 16 with a variation in the index of refraction that is close to that desired.

Figure 4:
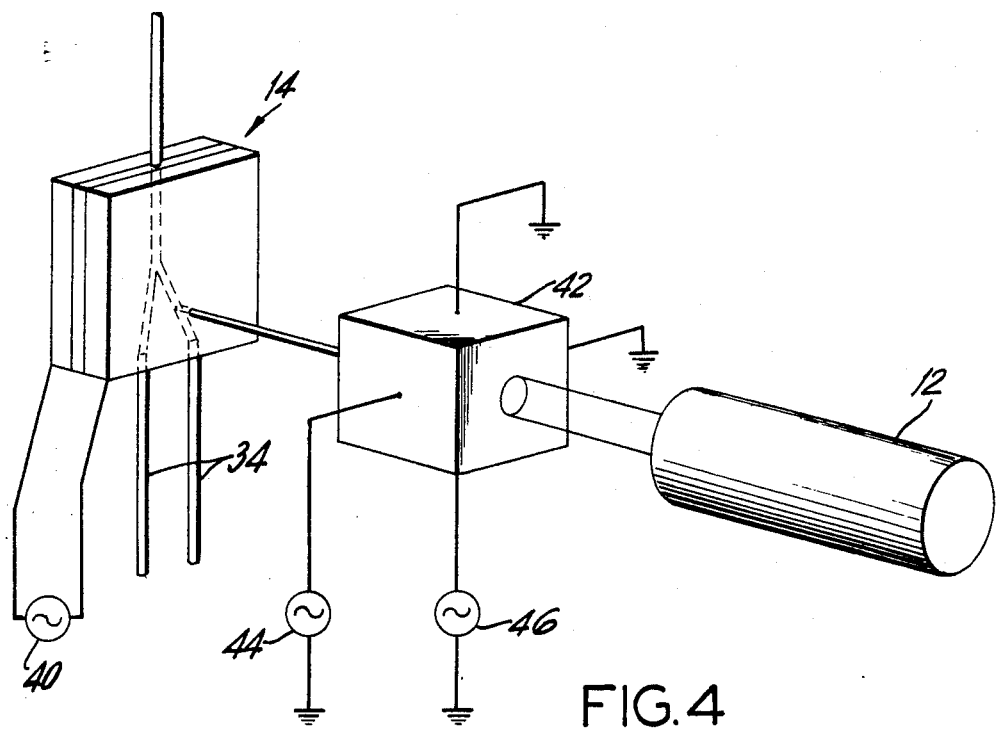
FIG. 4 is a perspective view of the apparatus of the present invention used with a laser scanner.

Referring to FIG. 4, a laser beam scanner 42 is substituted for the film 28. Laser beam scanners are well known in the art for providing a pattern generated in real time. Suitable laser beam scanners 42 are disclosed in, "Electrically Controlled Acoustic Beam Deflection", Proc. IEEE, January 1967. R. C. Addison et al.; "Laser Beam Scanning For High Density Data Storage And Retrieval", CBS Labs Report by L. Boiser, June 1967; and IBM News Release 7-16-66, "IBM Reports Scanning Laser Controlled By Electron Beam". The optical beam is directed to the input of the laser beam scanner 42. The laser beam scanner 42 is driven according to x and y related signals by drive circuits 44 and 46. The x and y coordinates are in the plane of the liquid crystal layer 16 and voltages can be established with relation to some reference, e.g., the center of the transducer device where $x = y = o$. The laser beam position could then be expressed as follows:

x = constant times $f_1(t)$
y = constant times $f_2(t)$

The functions $f_1(t)$ and $f_2(t)$ are time functions which are combined parametrically. For example, when each is expressed by sinusoidal variations of the same frequency and a phase difference of zero degrees exists between them, a straight line is generated whose angle with the vertical depends upon the magnitude of each signal. There are many possible combinations of signals possible, the foregoing being one example.

The laser beam scanner 42 may advantageously include a lens (not shown) so that the beam may be focused in the plane of the liquid crystal layer 16. In this case the pattern will have an approximate line width as follows:

$$\text{Linewidth} = 1.27 \left(\frac{\lambda}{a}\right) f$$

where $\lambda$, $a$, and $f$ are the laser wavelength, incident beam radius, and lens focal length, respectively.

Figure 5:
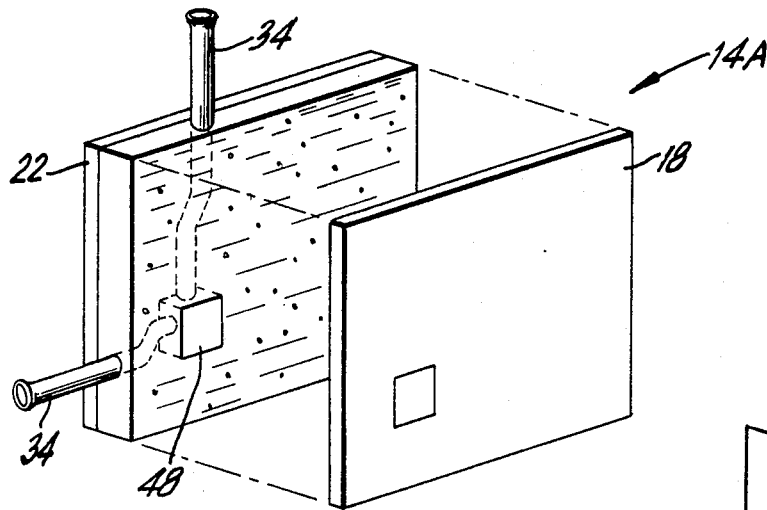
FIG. 5 is a partially exploded view of a typical liquid crystal transducer including a discrete optical element.

Referring to FIG. 5, an exploded view of a transducer device 14A is illustrated with one conducting glass electrode removed for clarity. An active device 48, e.g., a prism, a lens, a diffraction grating, etc., or a plurality of these, may be mounted within the plane of the liquid crystal layer 16 as integral part thereof. The mask or film employed with such transducer device 14A may advantageously include simple straight lines for optically interconnecting the active device 48 to the desired optical fibers 34. It is apparent that the pattern to be induced in the liquid crystal layer 16 is previously determined to anticipate the induced guide connections in this modification of the invention.

Figure 6:
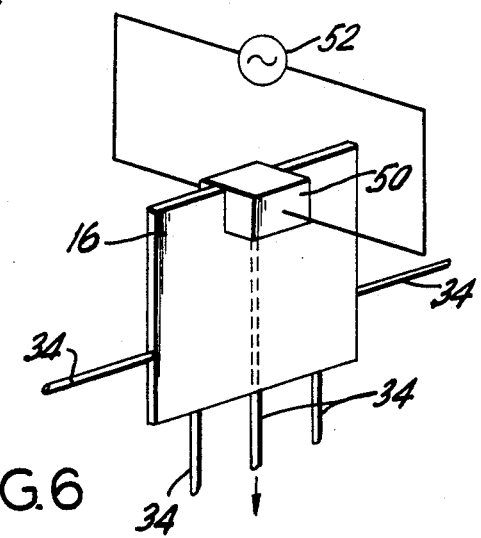
FIG. 6 is a perspective view of a liquid crystal layer having an injection laser with its emitting junction in the plane of the liquid crystal layer.
Figure 7:
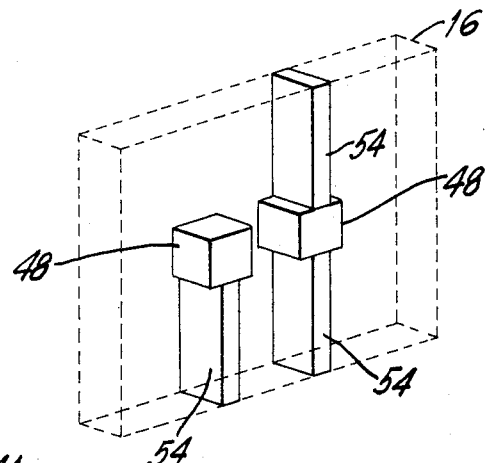
FIG. 7 is a perspective of a liquid crystal layer including discrete optical elements with fixed or hard wired channels.

Referring to FIG. 6, an injection laser or LED or other source of optical energy 50 may be mounted in the plane of the liquid crystal layer 16 as an integral part thereof. The laser or LED 50 is driven by a conventional drive oscillator 52. The laser or LED emits light into the plane of the layer 16 and directs light toward the desired optical fibers 34 in accordance with the optical pattern formed in the photoconductive layer (not shown). The active device 48 of FIG. 5 and injection laser or LED 50 may be combined and interconnected with one another or other integrated optical components, and may be used with fixed or hard wired optical circuits 54 as desired, see FIG. 7.

Figure 8:
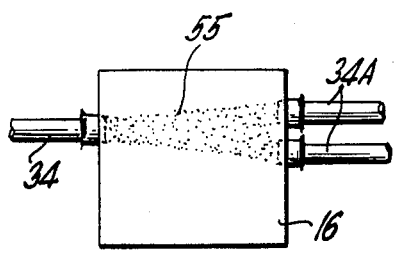
FIG. 8 is a plan view of a liquid crystal plane showing a scattering mode of operation of the present invention.

Referring to FIG. 8, a dynamic scattering region 55 is induced in the liquid crystal layer 16 as previously described, but with an applied voltage greater than that required for birefringent circuit generation. Under these conditions, the liquid crystal loses its birefringence and develops a light scattering characteristic often called the dynamic scattering mode. Light entering the layer through the optical fiber 34 is transferred to one or more other fibers 34A. The informational modulation arriving via the fiber 34 is simultaneously transferred to other fibers 34A by scattering. This mode of operation for the real time circuit generator is particularly desired when an incoming signal is to be coupled to several other, otherwise independent fibers or channels. When operated in the scattering mode of operation, the device as structured is known as an optical coupler, particularly useful in systems which require many transmit-receive stations.

Although the voltage required for the dynamic scattering is greater than the single channel birefringent mode, a voltage pulse can be shaped to incorporate both modes in a sequence. Moreover, each mode can be employed invidually or simultaneously in an arrangement such as that shown in FIGS. 9 and 10 where each electrode can receive individual voltages.

Figure 9:
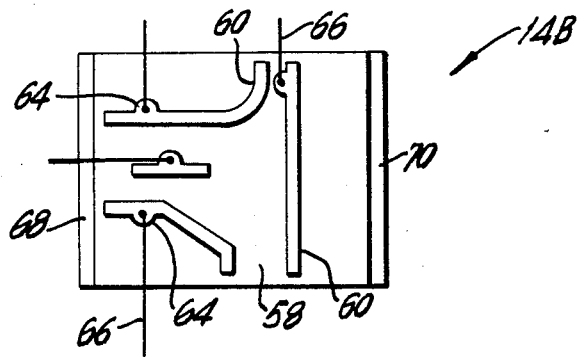
FIG. 9 is a plan view of a transparent ferroelectric ceramic for use in the present invention.
Figure 10:
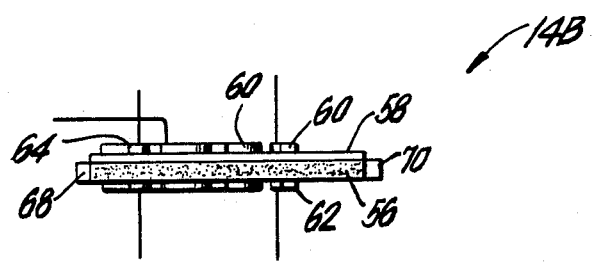
FIG. 10 is an end view of the transparent ferroelectric ceramic of FIG. 9.

Referring to FIGS. 9 and 10, a transparent ferroelectric ceramic layer 56 may be substituted for the nematic liquid crystal layer as shown in the transducer device 14B. It is known that the maximum index change in ferroelectric ceramics is sufficient to establish good optical guide conditions. Ferroelectric ceramics are initially optically isotropic but by poling, they can be made uniaxially birefringent for example in the plane of the ceramic plate. The birefringence can be reduced by illuminating as described above but with the polarization of the illuminating source perpendicular to the plane of the plate (see A. H. Meitzler et al., "Image Storage and Display Devices Using Fine Grain, Ferroelectric Ceramics", B.S.T.J., July-August 1970). The rigidity of the transparent ferroelectric ceramic layer 56 also enables a further modification of the transducer device 14B as shown in FIG. 9, in which the sides of the transparent ferroelectric ceramic 56 need not be completely covered with transparent electrodes. The transducer device 14B includes the transparent ferroelectric ceramic layer 56, e.g., fine grain lead zirconate-lead titanate 50 $\mu$m thick, affixed to a photoconductive layer 58, and transparent electrode strips 60 and 62 arranged on exposed sides of the layers 56 and 58. As seen in FIG. 8, the electrode strips 60 and 62 (not shown) include tabs 64 connected to leads 66, which are connected to an electrical generator (not shown) for subsequently erasing the optical circuit.

The leads 66 are arranged so not to inhibit the light beam which is directed toward the transparent electrode strips 60. Poling electrodes 68 and 78 coupled to a d.c. source (not shown) prepare the ferroelectric ceramic layer 56 to accept an image. The mask or film (not shown) has the same pattern as the transparent electrodes 60 and 62, or some fraction thereof, for inducing the desired optical circuit in the transducer device 14B. The mask or film is brought into registration with the transducer device 14B and illuminated. The light transmitted through the optical fibers (not shown) is conveyed through the transparent ferroelectric ceramic layer 56 in accordance with the optical pattern at those portions where the index of refraction is changed, as previously described with reference to the liquid crystal layer 16.

In operation of the present invention, the light is emitted from the source 12, filtered and focussed, as desired, and applied to a mask or film 28, or laser scanner 42, which provides the desired optical pattern or component. The mask or film 28 or laser scanner 42 are aligned or registered with the transducer device 14, so that the light exiting therefrom illuminates a predetermined portion of photoconductive layer 18. Assuming the liquid crystal layer 16 or ferroelectric ceramic layer 56 is properly biased (d.c. voltage), the layer 16 or 56 undergoes a molecular reorientation in accordance with the light pattern from the mask, film, or laser scanner. The light from the source 12 generally strikes the transducer device at an angle of 90° to the plane of the transducer device 14. However, it should be understood that in the preparation of special optical elements non-perpendicularity may be desired to optimize the configuration of the fibers.

The light being transmitted to certain optical fibers 34 (input) is directed to the desired optical fibers 34 (output) in accordance with the optical pattern emanating from the mask or film 28 or laser scanner 41. The electrical generator 40 is activated, as desired, to erase the optical channels or components generated in the liquid crystal layer 16 of ferroelectric ceramic layer 56, and another optical pattern is generated therein in a similar manner.

It should be understood by those skilled in the art that various modifications may be made in the present invention without departing from the spirit and scope thereof, as described in the description and defined in the appended claims.

What is claimed is:

1. A method of providing real time optical channels and components for interconnecting optical fibers coupled to a transducer, comprising the steps of:
    coupling the optical fibers to the transducer to provide an air free connection between the optical fibers and the transducer;
    generating the light beam;
    directing the light beam toward the transducer;
    controlling the transmission of the light beam to expose a predetermined portion of the transducer in accordance with a perdetermined pattern;
    optically interconnecting the optical fibers in accordance with the predetermined pattern upon exposure of the transducer to the light beam; and
    subsequently erasing the optical interconnection between the optical fibers.

2. The method recited in claim 1 including the step of:
    changing the predetermined pattern after the erasure step to provide optical interconnection of the optical elements in accordance with the changed pattern.

3. The method recited in claim 1 including the step of:
    varying the index of refraction of curved optical interconnections in accordance with a parabolic distribution to minimize radiation losses.

4. The method recited in claim 1 including the step of:
    filtering and focussing the generated light.

5. The method recited in claim 1 including the step of:
    directing the light beam through a film having the predetermined pattern.

6. The method recited in claim 5 including the step of:
    re-focussing the light beam emanating from the film.

7. The method recited in claim 1 including the step of:
    directing the generated light beam onto the transducer at an angle of 90° to the plane of the transducer.

8. The method recited in claim 1 including the step of:
    aligning the light beam, predetermined pattern, and transducer.

9. The method recited in claim 1 wherein the step of controlling the transmission includes the step of:
    deflecting the light beam onto the transducer in accordance with X-Y coordinate related drive signals.

10. The method recited in claim 9 including the step of:
    varying the linewidth of the deflected light beam.

11. The method recited in claim 1 including the step of:
    connecting poling electrodes to the transducer to optimize the optical pattern generated therin upon exposure to the light beam.

12. The method recited in claim 1 including the step of:

incorporating lumpted optical components within the transducer.

13. The method recited in claim 1 including the step of:
biasing the transducer for operation in the birefringent mode to optimize the conditions for providing an optical pattern in the transducer upon exposure to the generated light beam.

14. The method recited in claim 1 including the step of:
biasing the transducer for operation in the dynamic scattering mode.

15. A system for providing real time optical channels and components for optical fibers coupled to a transducer, comprising:
optical fibers mechanically coupled to the transducer through connectors extending outwardly therefrom, said connectors including means for expelling air to provide an air-free coupling between the optical fibers and the transducer upon insertion of the optical fibers into the connectors;
means for generating a light beam;
means interposed between said generating means and the transducer for transmitting a predetermined portion of the light beam to the transducer in accordance with a predetermined optical pattern to interconnect the optical fibers in accordance with the predetermined optical pattern formed in the transducer; and
means for erasing the optical pattern formed in the transducer.

16. The system recited in claim 15 wherein:
the transducer includes a photoconductive layer and an optical layer, sandwiched between a pair of transparent electrode layers.

17. The system recited in claim 16 wherein:
said optical layer is a nematic liquid crystal.

18. The system recited in claim 16 wherein:
said optical layer is a ferroelectric ceramic.

19. The system recited in claim 16 wherein:
said photoconductive layer includes cadmium sulfide and said transparent electrode layers include glass.

20. The system recited in claim 15 wherein:
said generating means includes a laser.

21. The system recited in claim 15 wherein:
said generating means includes an argon laser.

22. The system recited in claim 15 wherein:
said generating means includes a light emitting diode.

23. The system recited in claim 15 wherein:
said generating means includes an injection laser.

24. The system recited in claim 15 wherein:
said transmitting means includes a plurality of patterns.

25. The system recited in claim 15 including:
means for filtering and focussing the generated light beam.

26. The system recited in claim 25 including:
means for re-focussing the light beam upon exiting from said transmitting means.

27. The system recited in claim 15 wherein:
said transmitting means includes a mask having a glass substrate and copper coating on one side thereof, the optical pattern corresponding to the removed portions of the copper coating.

28. The system recited in claim 15 wherein:
said transmitting means includes a film.

29. The system recited in claim 15 wherein:
said generating means includes a laser;
said transmitting means includes a laser scanner with drive means for establishing X and Y coordinates and providing an output beam pattern in response to the generated laser beam.

30. The system recited in claim 29 wherein:
said laser scanner includes a lens, the linewidth of the output beam is equal to $1.27 (\lambda/a) f$ where $\lambda$, $a$, and $f$ are the wavelength and radius of the generated laser beam and $f$ is the focal length of the lens.

31. The system recited in claim 15 wherein:
the transducer is oriented perpendicular to the light beam emanating from said generating means.

32. The system recited in claim 15 wherein:
the transducer has poling electrodes coupled thereto.

33. The system recited in claim 15 wherein:
the transducer includes a ferroelectric ceramic.

34. The system recited in claim 15 wherein:
the transducer includes a nematic liquid crystal with lumped components embedded therein.

35. The system recited in claim 34 wherein:
said lumped components include an injection laser.

36. The system recited in claim 15 wherein:
the transducer includes a photoconductive layer affixed to a ferroelectric ceramic layer with a plurality of transparent electrode strips arranged on the exposed sides of said layers.

37. The system recited in claim 15 including:
voltage means for biasing the transducer for operation in the birefringent mode.

38. The system recited in claim 15 including:
voltage means for biasing the transducer for operation in the dynamic scattering mode.

39. The system recited in claim 15 including:
voltage means for biasing the transducer for operation in the birefringement and dynamic scattering mode.

40. The system according to claim 3 wherein the step of generating a light beam is performed using a laser.

41. The system according to claim 24 wherein said generating means includes a laser.

* * * * *

UNITED STATES PATENT AND TRADEMARK OFFICE
CERTIFICATE OF CORRECTION

PATENT NO. : 3,993,400
DATED : November 23, 1976
INVENTOR(S) : Kenneth G. Leib

It is certified that error appears in the above-identified patent and that said Letters Patent are hereby corrected as shown below:

Column 5, line 17: Delete "2."

line 21: "$1 \ \frac{x^2}{3}$" should be -- $1 - \frac{x^2}{3}$ --

Column 8, line 13: "the" should be --a-- line 65: "therin" should be --therein--

Column 9, line 1: "lumpted" should be --lumped--

Column 10, line 21: "1.27 $(\lambda/a)$" should be

--1.27 $(\lambda/a) f$ -- line 22: "$f$ where" should be --where--

Signed and Sealed this

Eighth Day of March 1977

[SEAL]

Attest:

RUTH C. MASON
Attesting Officer

C. MARSHALL DANN
Commissioner of Patents and Trademarks